July 1, 1969  G. W. FLETCHER ET AL  3,452,801

AIR COMPRESSING AUTOMOTIVE WHEEL

Filed May 16, 1967  Sheet 1 of 3

INVENTOR.
GEORGE W. FLETCHER AND
BY KENNETH W. FLETCHER.

ATTORNEY

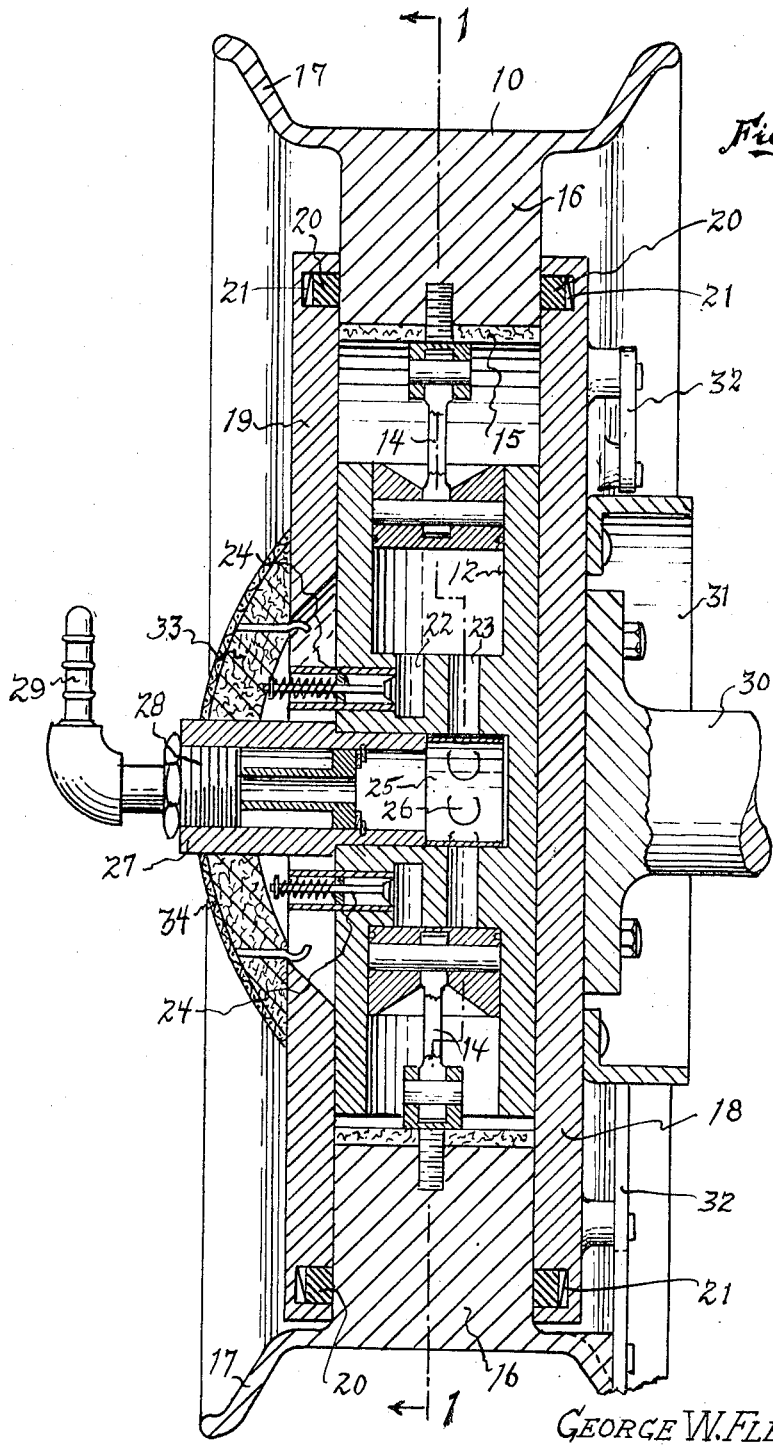

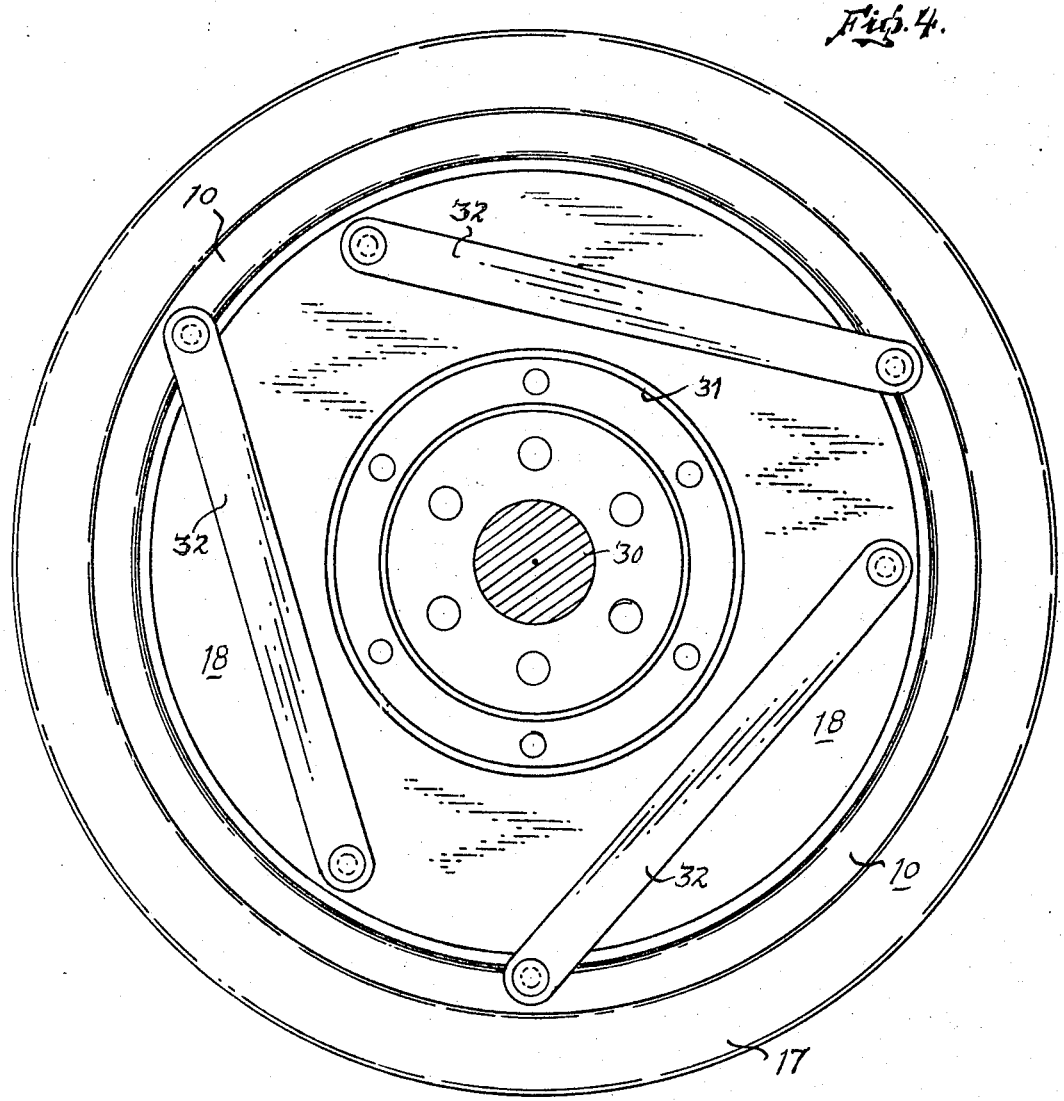

United States Patent Office 3,452,801
Patented July 1, 1969

3,452,801
AIR COMPRESSING AUTOMOTIVE WHEEL
George Warren Fletcher, 1271 48th Ave. 94122, and Kenneth W. Fletcher, 127 Cutler St. 94116, both of San Francisco, Calif.
Filed May 16, 1967, Ser. No. 638,928
Int. Cl. B60c 23/10, 29/00
U.S. Cl. 152—419      4 Claims

ABSTRACT OF THE DISCLOSURE

An automobile wheel having a centrally disposed air compressor unit with valves and pistons operating about an axis corresponding with the supporting axle of the wheel with a tire supporting rim operating eccentric to the wheel axle having a deep felloe movable between oppositely spaced supporting plates. The felloe carries a plurality of pistons corresponding in number with the cylinders of the compressor unit with a plurality of tangentially extending torque bars connected thereto for maintaining said rim in operating relation with the air compressor cylinders.

---

Our present invention is concerned with the provision of an air compressing unit which can be assembled within the normal plane of a conventional tire supporting vehicle wheel. It comprises a compressor unit having radially extending piston accommodating cylinders with pitmans connected to a tire carrying rim which is mounted for rotation about an axis eccentric to and above the normal axis of the wheel, whereby the weight of a vehicle upon said axis will cause said tire supporting rim to maintain an upward eccentric position with the result that the pitman connections between said pistons and said eccentrically disposed tire supporting rim will operate to compress air successively in said radially extending cylinders as the intake and outlet valves respond to pressures exerted thereupon as said tire supporting rim turns about its eccentric axis.

The object of our invention is to provide an air compressing unit that can be incorporated in the wheel of an automobile and which will be practical, efficient in operation and inexpensive in its manufacture.

Another object of our invention is to provide an air compressing automotive wheel by which air may be compressed and applied to useful work in and about an automobile when in motion.

Other objects and advantages will be in part evident to those skilled in the art and in part pointed out hereinafter in connection with the accompanying drawings wherein there is shown by way of illustration and not of limitation a preferred embodiment of the invention.

Figure 1:
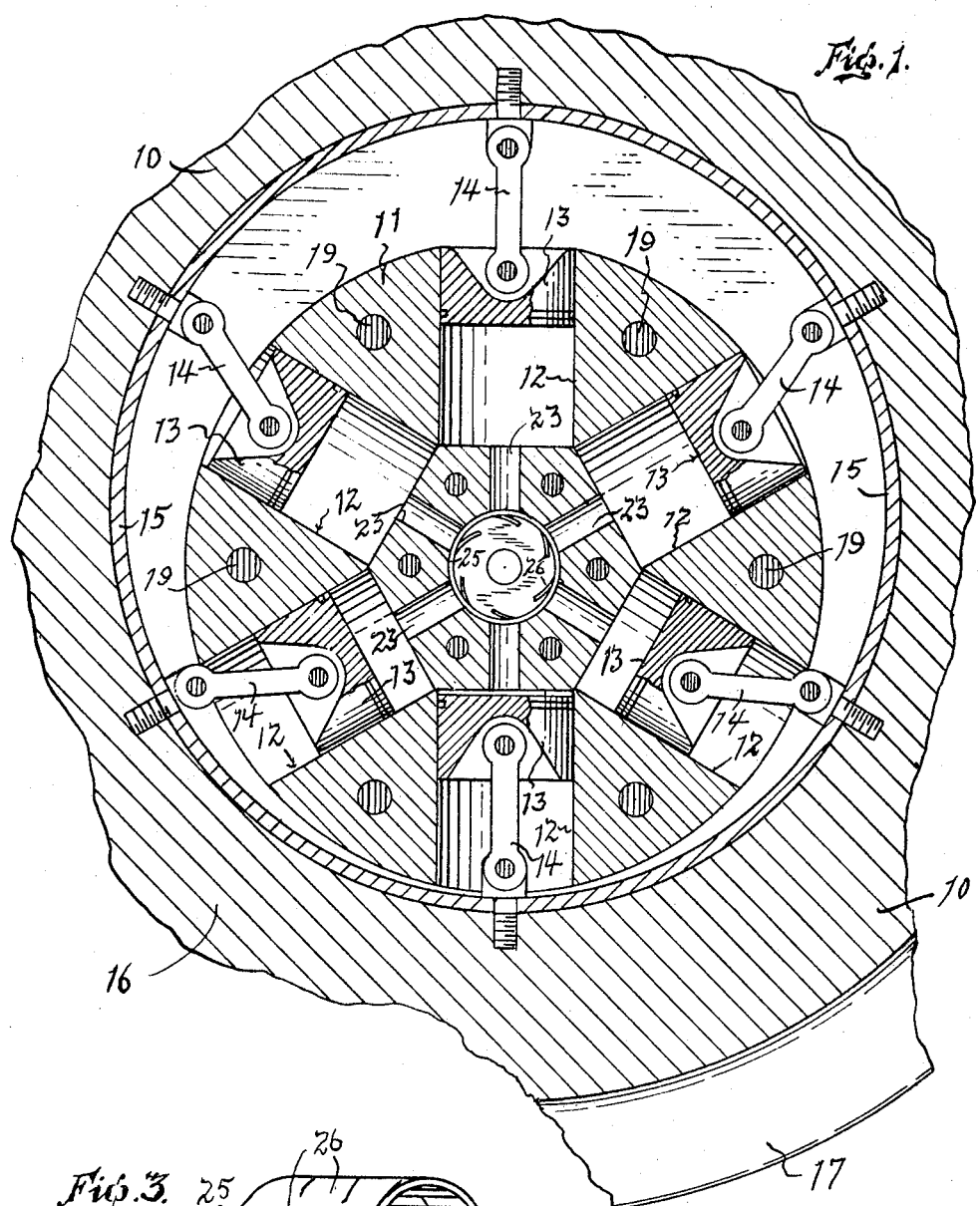
Figure 3:
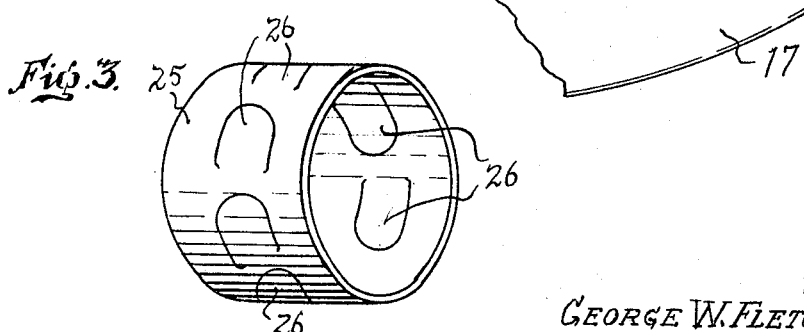

In the drawings:
FIGURE 1 is a sectional view taken in a normal plane of the wheel,
FIGURE 2 is a vertical sectional view taken along line 2—2 of FIGURE 1,
FIGURE 3 is a perspective view of the outlet valve of the compressor unit, and
FIGURE 4 is an end view looking from the right of FIGURE 2.

Our present invention relates generally to the concept for an automobile wheel with an air compressing unit mounted therein for supplying compressed air for uses in and about an automobile as, for example, the operation of a pneumatic motor for driving a battery charging generator to provide for re-charging the batteries generally provided for the engine starting operations. In the patent to Daniel F. Groat, 1,423,607, entitled "Tire Operated Multiple Air Pump" there is shown an eccentrically disposed pumping unit within an automobile wheel, but unlike the Groat arrangement, our invention is considered to operate on a different principle and embodies many novel features which render our invention more practical and efficient.

Reference is now made to the accompanying drawings where in FIGURE 1, our improved pump is shown as consisting of two major parts in the form of an outer automotive tire supporting rim 10 that is mounted to gyrate in the plane of the wheel about a central pneumatic pump assembly 11 which is mounted at the end of an automobile or other vehicle supporting shaft, not here shown, for movement with the wheel as it turns. The pump assembly 11 is in the form of a short cylindrical body member having spaced radially extending piston accommodating cylinders 12 into which pistons 13 are mounted for reciprocating motion. Each of the pistons 13 are connected by pitmans 14 through an impact and friction establishing lining 15 such as a brake band or other material that extends around the inner periphery of the tire supporting rim. The tire supporting rim 10, as will hereinafter appear, has a deep felloe portion 16 with tire retaining flanges 17 extending outwardly therefrom.

By now referring to FIGURE 2 of the drawings, it will be noted that the deep felloe portion 16 of the tire supporting rim 11 is of substantially rectangular cross-section and is positioned between two spaced oppositely disposed plates 18 and 19 that are secured to the body portion 11 of the pump assembly by means of bolts 19 passing therethrough. The felloe 16 is also of a depth sufficient to permit the required relative radial movement thereof between the opposite rim supporting plates 18 and 19. To provide a seal between the spaced supporting plates 18 and 19 and the felloe 16, the supporting plates are shown as each having an annular sealing ring 20 that are urged into contact with the felloe 16 by means of flat wave-like annular spring rings 21. As is also indicated in this latter figure of the drawings, each of the cylinders 12 have an inlet port 22 and an output port 23 through which air is respectively sucked into and exhausted from the cylinders 12 as the pistons 13 reciprocate therein. Associated with the inlet ports 22 there are individual check valves 24 which permit the entrance of air on the suction stroke of the pistons, and associated with the exhaust ports 23 there is, as shown in FIGURE 3, a cylindrical valve in the form of a sleeve 25 having flap portions 26 which will respond to pressure upon each air compressing stroke of the several pistons 12. The sleeve valve 25 is positioned with respect to the outlet ports 23 by a threaded sleeve 27 having a nipple 28 which carries an air conducting fitting 29 by which compressed air may be directed through a flexible hose to any suitable point of use. The pump assembly with its spaced supporting plates 18 and 19 is here shown as carried by a shaft 30 with a conventional brake drum 31, but it is to be understood that our pump may be used with any weight supporting vehicle either with or without a driving connection as provided for by the shaft 30.

In order to provide against any excessive displacement of the tire carrying rim from its orbit about the pump assembly 11, we have, as shown in FIGURE 4 of the drawings, provided a series of torque bars 32 that extend substantially tangent to the axis of the wheel and are connected at their corresponding ends between the space supporting plate 21 and the tire supporting rim 10. In this arrangement it will be understood that while these torque bars will permit the vertical movement of the tire supporting rim with respect to the pump assembly as the weight of the automobile is placed upon the tire, carried by rim 10, these torque bars will permit the necessary radial displacement in the position of the pitmans 14 as the tire carrying rim moves upwardly and above the pump assembly as the wheel rotates.

As insurance against the admission of dust and other foreign matter, the air intake valves 24 are shown as enclosed within a filter means 33 which is carried by a metallic screen 34.

While we have, for the sake of clearness and in order to disclose our invention so that the same can be readily understood, described and illustrated a specific form and arrangement, we desire to have it understood that this invention is not limited to the specific form disclosed, but may be embodied in other ways that will suggest themselves to persons skilled in the art. It is believed that this invention is new and all such changes as come within the scope of the appended claims are to be considered as part of this invention.

Having thus described our invention, what we claim and desire to secure by Letters Patent is:

1. An air compressing automotive wheel, comprising outer tire carrying rim having a deep felloe portion of substantially rectangular cross-section, means for supporting said tire carrying rim consisting of two oppositely and axially spaced plates between which the felloe portion of said rim is movably retained for oscillatory movement with respect to the axis of the wheel, said oppositely disposed plates each having a recessed annular sealing ring concentric with the axis of the wheel and in contact with the felloe portion of said rim as it oscillates, an air compressing unit secured between said opposite rim supporting plates at the center of the wheel having a plurality of radially extending piston accommodating cylinders, a piston operating in each of said cylinders having a pitman in connection with said oscillating tire supporting rim, said pitmans being adapted and arranged to impart a reciprocating movement to said pistons as the wheel as a whole rotates about its axis, an air input check valve having connections with the interior of each of said cylinders, a centrally disposed cylindrical chamber extending along the axis of the wheel having air output ports leading from each of said cylinders, connections for conducting air from said cylindrical chamber for application to useful work, and a cylindrical valve mounted within said chamber having flaps registering with the air output ports of said cylinders adapted and arranged to open as said pistons move in an air compressing direction, whereby air compressed in said cylinders will be conducted externally of said cylindrical chamber as the wheel turns.

2. The invention as set forth in claim 1, characterized by the fact that the valve operating in said cylindrical chamber is in the form of a thin flexible length of steel tubing with areas formed therein as flexible flaps located at the outlet ports of said cylinders, adapted and arranged to open on the successive air compressing strokes of said pistons as the wheel rotates.

3. The invention as set forth in claim 1, characterized by the fact that the pitman connections for the pistons of said cylinders are connected within the felloe portion of the tire carrying rim through a band of impact receiving and friction establishing material, whereby said pitmans will be free for limited angular adjustment with respect to the piston accommodating cylinders as the tire supporting rim moves between said spaced oppositely disposed supporting plates.

4. The invention as set forth in claim 1, characterized by the fact that said tire carrying rim is limited in its radial displacement with respect to the pump assembly by torque bars connected at their ends and extending tangent to the axis of the wheel between the tire supporting rim and one of the spaced oppositely disposed rim supporting plates.

References Cited

UNITED STATES PATENTS 1,057,846    4/1913    Kanter _____ 152—419

ARTHUR L. LA POINT, *Primary Examiner.*